United States Patent [19]
Nölken et al.

[11] Patent Number: 5,708,077
[45] Date of Patent: *Jan. 13, 1998

[54] LOW-EMISSION DISPERSION PAINTS, COATING MATERIALS AND SYNTHETIC RESIN DISPERSION PLASTERS AS WELL AS PROCESSES FOR THE PREPARATION THEREOF

[75] Inventors: Ernst Nölken, Bad Soden am Taunus; Helmut Braun, Kriftel; Michael Lonitz, Trechtingshausen, all of Germany

[73] Assignee: Hoechst AG, Germany

[*] Notice: The term of this patent shall not extend beyond the expiration date of Pat. No. 5,576,384.

[21] Appl. No.: 746,741

[22] Filed: Nov. 15, 1996

Related U.S. Application Data

[62] Division of Ser. No. 447,389, May 23, 1995, Pat. No. 5,576,384, which is a continuation of Ser. No. 855,734, Mar. 19, 1992, abandoned, which is a continuation of Ser. No. 633,276, Dec. 24, 1990, abandoned, which is a continuation of Ser. No. 306,881, Feb. 3, 1989, abandoned.

[30] Foreign Application Priority Data

Feb. 5, 1988 [DE] Germany ................ 38 03 450.6

[51] Int. Cl.$^6$ .................................................. C08L 83/04
[52] U.S. Cl. .................................... 524/806; 524/457
[58] Field of Search ............................. 524/457, 837, 524/806

[56] References Cited

U.S. PATENT DOCUMENTS

| | | | |
|---|---|---|---|
| 3,729,438 | 4/1973 | Plecsich et al. | 524/806 |
| 5,576,384 | 11/1996 | Nolken et al. | 524/806 |

*Primary Examiner*—Jeffrey I. Smith
*Attorney, Agent, or Firm*—Bierman, Muserlian & Lucas

[57] ABSTRACT

Production of low-emission dispersion paints, coating materials and synthetic resin dispersion plasters in the form of aqueous preparations based on aqueous synthetic resin dispersion copolymers derived from olefinically unsaturated monomers, having a pigment volume concentration (PVC) of at least 60% and containing water, fillers, pigments, synthetic resin dispersion copolymers and conventional auxiliaries, wherein the synthetic resin dispersion copolymers have a content of 0.05 to 2% by weight of monomer units derived from special unsaturated hydrolyzable organic silicon compounds and the aqueous copolymer dispersions possess a minimum film-forming temperature (MFT) of <10° C. preferably <5° C. and especially <2° C., the aqueous preparations according to the invention contain <0.1% by weight of volatile non-aqueous constituents, based on the total non-volatile part of the preparations, and the pH of the aqueous preparations is in the range from 5.5 to 10.

In particular, the low-emission aqueous preparations produced according to the invention are free of volatile organic solvents, volatile organic film-forming auxiliaries, low-molecular plasticizers, residual monomers from the preparation of the dispersion copolymer, other highly volatile non-aqueous constituents and malodorous by-products.

Use of the dispersion paints, coating materials and synthetic resin dispersion plasters as building-protection materials or as structural materials, especially in spaces which are inadequately ventilated and inhabited.

1 Claim, No Drawings

LOW-EMISSION DISPERSION PAINTS, COATING MATERIALS AND SYNTHETIC RESIN DISPERSION PLASTERS AS WELL AS PROCESSES FOR THE PREPARATION THEREOF

PRIOR APPLICATIONS

This application is a division of U.S. patent application Ser. No. 447,389 filed May 23, 1995, now U.S. Pat. No. 5,576,384 which is a continuation of U.S. patent application Ser. No. 855,734 filed Mar. 19, 1992 now abandoned which is a continuation of U.S. patent application Ser. No. 633,276 filed Dec. 24, 1990 now abandoned which is a continuation of U.S. patent application Ser. No. 306,881 filed Feb. 3, 1989, now abandoned.

DESCRIPTION

Low-emission dispersion paints, coating materials and synthetic resin dispersion plasters as well as processes the preparation thereof.

The invention relates to low-emission dispersion paints, coating materials and synthetic resin dispersion plasters in the form of aqueous preparations based on aqueous synthetic resin dispersions having a pigment volume concentration (PVC) of at least 60% which are free from organic solvents and volatile organic film-forming auxiliaries and low-molecular weight plasticizers, and which are free from readily volatile non-aqueous constituents and from malodorous by-products, furthermore to processes for the preparation thereof and to the use thereof as construction protective materials and as structural materials, especially in spaces that are inadequately ventilated and are inhabitated.

In order to reduce pollution by noxious substances it is often desirable for aqueous dispersion paints, coating materials and synthetic resin dispersion plasters, when used in the open or especially in enclosed spaces, to be unable to liberate, apart from water, any non-aqueous volatile organic or inorganic constituents.

However, according to the state of the art, construction protective materials such as, for example dispersion paints, plasters, mastics, and liquid adhesives, contain more or less large amounts of solvents. The readily volatile or the moderately to slightly volatile additives here used as solvents or film-consolidating or film-forming auxiliaries or also as plasticizers, are generally indispensable for achieving the required application properties of the construction protective materials. In order to attain high wet abrasion resistance, mechanical strength, low tendency to soiling and to blocking of the used materials, it has not been hitherto possible to employ dispersion polymers whose aqueous dispersions possess a freezing or glass temperature (Tg) or a minimum film-forming temperature (MFT) in the neighborhood of 0° C. These application properties could accordingly only be achieved by the use of polymer dispersions having a Tg or MFT distinctly above 0° C. in conjunction with film-forming auxiliaries which reduce the Tg or MFT, with the result that it was possible to employ them even at, or, if desired, below 5° C. Film-forming auxiliaries and temporary plasticizers, however, migrate into the atmosphere on drying, which may be toxicologically hazardous especially with indoor paints, for example through unpleasant odor or through inhalation by sensitive persons.

Permanent plasticizers have also been used in the past. This can lead to shortcomings due to increased tackiness, plasticizer migration as well as to possible volatility.

Experiments were also undertaken into using vinyl acetate dispersion copolymers, especially vinyl acetate/ethylene copolymer dispersions which possess a Tg or a MFT in the neighborhood of 0° C.

It was found, however, that the pigment binding power of such dispersions is limited compared with systems having binders obtained from harder dispersion copolymers with additions of film-consolidating auxiliaries.

Thus the object forming the basis of the present invention has been to make available such aqueous dispersion paints, coating materials and plasters which contain no significant proportions of non-aqueous volatile compounds apart from water and which contain as binders synthetic resin dispersions which are free from film-forming auxiliaries, and which have a high pigment binding power per se and moreover whose films possess low tendency to soiling and to blocking even at a low Tg or low MFT of the dispersion.

It has now been found, surprisingly, that the foregoing difficulties may be overcome by using dispersions of such synthetic resin dispersion copolymers whose copolymer macromolecules contain small amounts of monomeric units derived from unsaturated hydrolyzable organic silicon compounds and possess the required Tg and MFT values, and furthermore the dispersions are virtually free from volatile non-aqueous organic and/or inorganic constituents.

Accordingly, the subject matter of the invention are low-emission dispersion paints, coating materials and synthetic resin dispersion plasters in the form of aqueous preparations based on aqueous synthetic resin dispersion polymers derived from olefinically unsaturated monomers having a pigment volume concentration (PVC) of at least 60% and containing water, fillers, pigments, synthetic resin dispersion polymers and auxiliaries selected from the group wetting agents, dispersants, emulsifiers, protective colloids, thickeners, antifoams, dyes and preservatives, wherein the non-volatile part of the aqueous preparations contains 35 to 94% by weight of a filler,
2 to 30% by weight of a pigment,
0.1 to 10% by weight of an auxiliary and
4 to 35% by weight of a synthetic resin dispersion copolymer, based on the total non-volatile part, the aqueous dispersion of which copolymer possesses a minimum film-forming temperature (MFT) of <10° C., preferably <5° C. particularly <2° C. and the synthetic resin dispersion copolymer has a content of 0.05 to 2% by weight, preferably 0.1 to 0.4% by weight, particularly 0.05 to 0.2% by weight, based on the synthetic resin dispersion copolymer, of monomeric units derived from unsaturated hydrolyzable organic silicon compounds of the formula I,

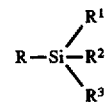

in which R denotes an organic radical olefinically unsaturated in the ω-position and $R^1$, $R^2$ and $R^3$ which may be identical or different, denote halogen, preferably chlorine, or the group —OZ, Z denoting primary or secondary alkyl or acyl radicals optionally substituted by alkoxy groups, or hydrogen, the content of volatile non-aqueous constituents of the aqueous preparations being 0.1% by weight, preferably <0.05% by weight, based on the total non-volatile part, and the pH of the aqueous preparations being in the range from 5.5 to 10, preferably 7 to 9, particularly 8 to 9.

A preferred embodiment of the invention comprises the synthetic resin dispersion copolymer used containing monomeric units selected from the group vinyl esters, vinyl esters/ethylene, vinyl esters/vinyl chloride/ethylene, vinyl esters/vinyl versatates, vinyl esters/acrylic esters and acrylic esters/vinyl versatates/ethylene, in addition to monomeric units derived from compounds of the formula I.

Preferred compounds of the formula I are, for example, γ-acryloxypropyltrimethoxysilane, γ-methacryloxypropyltrimethoxysilane, vinyltrimethoxysilane, vinyltriethoxysilane, vinyltrimethylglycol silane, vinyltriacetoxysilane, vinyltrichlorosilane, vinylmethyldichlorosilane and γ-methacryloxypropyltris(2-methoxyethoxy)silane.

A particular variant of the invention is for the synthetic resin dispersion copolymer used to comprise mixtures of dispersion copolymers, a part of which contains no monomeric units of the formula I and another part of which contains monomeric units of the formula I in such an amount that the mean content of monomeric units of the formula I in the total dispersion copolymer mixture is 0.05 to 2% by weight, preferably 0.1 to 0.4% by weight, particularly 0.05 to 0.2% by weight, based on the total synthetic resin dispersion copolymer mixture.

Furthermore, a particular feature according to the invention is that the aqueous preparations according to the invention are free from readily volatile residual monomers, from low alcohols and from ammonia and/or volatile amines or from components which give rise by cleavage to $H_2S$ or mercaptans, if appropriate, and the total content of volatile non-aqueous constituents of the aqueous preparations is <0.05% by weight, based on the total non-volatile part.

The preparation of synthetic resin copolymer dispersions, where the monomers are copolymerized with hydrolyzable, unsaturated organic silicon compounds of the formula I, is known.

Synthetic resin dispersions based on vinyl acetate with 0.5 to 1% by weight, based on the total amount of monomers, of a copolymerizable silane, such as, for example, vinyltrimethoxysilane, γ-methacryloxypropyltrimethoxysilane and vinyl tris(2-methoxyethoxy)silane, are known from U.S. Pat. No. 3,729,438. The polymer crosslinks on drying, giving rise to a clear, high-gloss film.

U.S. Pat. No. 3,814,716 describes synthetic resin dispersions based on vinyl acetate, acrylic esters, maleic and fumaric esters with 0.5 to 5% by weight of a copolymerizable silane. On drying the synthetic resin dispersion yields clear, high-gloss and crosslinked films with excellent water and solvent resistance.

The use of polymeric binders in aqueous dispersion for the preparation of structural coating materials are known from DE-PS 2,148,457, where the synthetic resin dispersions contain polymers from vinyl esters, acrylic esters or butadienestyrene copolymers into which the silanol groups have been introduced by polymerization.

The preparation of aqueous synthetic resin dispersions based on vinyl esters of carboxylic acids of 2 to 18 carbon atoms, ethylene, optionally up to 25% by weight of other olefinically unsaturated monomers and 0.3 to 5% by weight, based on the total amount of monomers, of an unsaturated hydrolyzable organic silicon compound, is known from DE-PS 2,148,458. Films prepared from the synthetic resin dispersions described exhibit with copolymers containing 1 to 2% by weight of the silicon compounds named above, high drying and wet peeling strengths on glass and asbestos cement. However, the synthetic resin dispersion prepared according to Example 1 of the above DE-PS possesses a 0.2% by weight content of unreacted monomeric vinyl acetate and the synthetic resin dispersions prepared according to Examples 6 and 10 contain, respectively, 3.8 and 4.8% by weight of methanol, in each case based on the polymeric part.

It cannot be simply assumed or deduced from the above state of the art that synthetic resin dispersions containing silanol groups may also give rise, in addition to a high pigment binding power in dispersion paints, to an improvement of the pull-off resistance of the coatings produced by the paints and, in addition, to a low tendency to soiling and blocking of the films or coatings produced therefrom, despite a low Tg and a low MFT.

It was therefore the more surprising to find that with binders based on synthetic resin dispersions having a low MFT, in the absence of volatile organic film-forming auxiliaries, a marked improvement of the binder properties is achieved if the dispersion copolymers contain only very small amounts of monomeric units with silanol groups formed from compounds of the formula I, amounts from 0.1 to 0.4% by weight, based on the total amount of monomer, being preferred.

A preferred embodiment of the present invention further is that the synthetic resin dispersion copolymer contained in the aqueous preparations and carrying silicon radicals in the monomeric units of the formula I was prepared by radically initiated copolymerization of the finely divided monomers having an amount of 0.05 to 2% by weight, preferably 0.1 to 0.4% by weight, particularly 0.05 to 0.2% by weight, based on the total amount of monomer, of monomers of the formula I in aqueous medium with the simultaneous use of hydroxyethylcellulose, non-ionic emulsifiers and monomeric sodium vinylsulfonate as emulsifier/protective colloid system, and the volatile alcohol components which may have formed by hydrolysis from the monomeric units of the formula I in the aqueous dispersion and any volatile amounts of residual monomers which may be present after the terminated polymerization reaction have been removed by physical methods, preferably by distillation under reduced pressure.

In the preparation of the synthetic resin dispersion copolymers, for example by emulsion polymerization, the alkoxy, acyloxy and halogen radicals of the silicon compounds of the formula I used hydrolyze at least partially to give silicon compounds containing hydroxyl groups (silanol groups) which are then contained in the copolymer and may lead to crosslinking between the macromolecules.

Suitable hydrolyzable unsaturated organic silicon compounds of the formula I are preferably those in which the radical R in the formula I represents an ω-unsaturated alkenyl of 2 to 10 carbon atoms, particularly of 2 to 4 carbon atoms, or an ω-unsaturated carboxylic acid ester formed from unsaturated carboxylic acids of up to 4 carbon atoms and alcohols carrying the Si group of up to 6 carbon atoms. Suitable radicals $R^1$, $R^2$, $R^3$ are preferably halogen, particularly chlorine, and the group —OZ, Z representing primary and/or secondary alkyl radicals of up to 10 carbon atoms, preferably up to 4 carbon atoms, or alkyl radicals substituted by alkoxy groups, preferably of up to 3 carbon atoms, or acyl radicals of up to 6 carbon atoms, preferably of up to 3 carbon atoms, or hydrogen.

Examples of such compounds of the formula I are vinyltrichlorosilane, vinylmethyldichlorosilane, γ-methacryloxypropyltris(2-methoxyethoxy)silane, vinylmethoxysilane, vinyltriethoxysilane, vinyldiethoxysilanol, vinylethoxysilanediol, allyltriethoxysilane, vinyltripropoxysilane, vinyltriisopropolysilane, vinyltributoxysilane, vinyltriacetoxysilane, trimethylglycolvinylsilane, γ-methacryloxypropyltrimethylglycolsilane, γ-acryloxypropyttriethoxysilane and γ-methacryloxypropyltrimethoxysilane.

The removal of residual monomers in the synthetic resin copolymer dispersions used according to the invention may also be carried out by resorting to known chemical methods such as, for example, by radically initiated, preferably using redox catalysts, secondary polymerization. Should subsequently traces of volatile monomers be still present in the dispersion, these can be readily removed by other methods, preferably by physical methods, particularly by distillation, preferably under reduced pressure and, if desired, by passing inert carrier gases such as, for example, air, nitrogen, $CO_2$ or steam, through or over the reaction mixture.

A particular feature of the present invention is also the fact that the synthetic resin copolymer dispersions used according to the invention are not only free from volatile residual monomers, but also that any volatile alcohols forming or formed in the hydrolysis of the used comonomers of the formula I, such as, for example, methanol, methoxyethanol or isopropanol, have been removed by the aftertreatment referred to above using chemical and/or physical methods. This may be of considerable significance when, for example, vinyltrimethoxysilane is used as comonomer, since the methanol formed by hydrolysis and present in the resultant dispersion may prevent the use of the dispersion on toxicological grounds, if the methanol has not been eliminated beforehand.

The aqueous preparations according to the invention comprise in their final composition to be used as construction protective materials or structural materials, if appropriate, preferably also the following components as further auxiliaries in addition to the constituents from the synthetic resin copolymer dispersion:

0.1 to 0.6%, by weight of a wetting agent or dispersant for filler and pigment,
0.1 to 1% by weight of a thickener,
0.01 to 2% by weight of a preservative and
0.001 to 0.5% by weight of an antifoam,
each based on the total weight of the aqueous preparations.

The aqueous preparations according to the invention in the form of dispersion paints, coating materials and synthetic resin dispersion plasters, using synthetic resin dispersion copolymer latices according to the invention, which preparations are free from residual monomers and other volatile constituents, may be prepared by application of known techniques, such as they are used in the preparation of conventional products of this type using conventional synthetic polymer latices. However, it is important that in the choice of the usual starting materials attention is paid particularly to their freedom from ammonia, amines, ammonium compounds, alkyl ammonium compounds, solvents, $H_2S$, $SO_2$ and formaldehyde as well as freedom from other volatile organic substances.

Preferred fillers used are, for example, calcium carbonate, magnesite, dolomite, kaolin, mica, talc, silica, calcium sulfate, feldspar, barium sulfate and plastic beads.

Examples of white pigments used are zinc oxide, zinc sulfide, basic lead carbonate, antimony trioxide, lithopone (zinc sulfide+barium sulfate) and, preferably, titanium dioxide.

Examples of inorganic colored pigments which may preferably be used are iron oxides, carbon black, graphite, luminescent pigments, zinc yellow, zinc green, Paris blue, ultramarine, manganese black, antimony black, manganese violet or Schweinfurt green.

Suitable organic colored pigments preferably are, for example, sepia, gamboge, Cassel brown, toluidine red, para red, Hansa yellow, indigo, azo dyes, anthraquinone and indigo dyes as well as dioxazine, quinacridone, phthalocyanin, isoindolinone and metal complex pigments of the azomethine series.

The fillers may be used as individual components. Mixtures of fillers such as, for example, calcium carbonate/kaolin and calcium carbonate/kaolin/talc have been found to be particularly useful in practice. To increase the hiding power and to save on titanium dioxide, finely divided fillers such as, for example, finely divided calcium carbonate and mixtures of various calcium carbonates with different particle size distribution are frequently used.

To adjust the hiding power, the shade and the depth of color the fillers are mixed with appropriate amounts of white pigment and inorganic and/or organic colored pigments.

To disperse the fillers and pigments in water, 0.1 to 0.6% by weight, based on the total weight of the aqueous preparation, of auxiliaries based on anionic or non-ionic wetting agents, such as preferably, for example, sodium pyrophosphate, sodium polyphosphate, naphthalenesulfonate, sodium polyacrylate, sodium polymaleinates and polyphosphonates such as sodium 1-hydroxyethane-1,1-diphosphonate and sodium nitrilotris (methylenephosphonate), may be added.

Thickeners which may be used, are inter alia preferably cellulose derivates such as methylcellulose, hydroxyethylcellulose and carboxymethylcellulose. Other thickeners which may be used, are casein, gum arabic, gum tragacanth, starch, sodium alginate, polyvinyl alcohol, polyvinylpyrrolidone, sodium polyacrylate and water-soluble copolymers based on acrylic and methacrylic acid, such as acrylic acid/acrylamide and methacrylic acid/acrylic ester copolymers.

Inorganic thickeners, such as, for example, bentonites or hectorite, may also be used.

Such thickeners are generally employed in amounts from 0.1 to 3% by weight, preferably 0.1 to 1% by weight, based on the total weight of the aqueous preparations The thickener may be incorporated already during the dispersion of the fillers and pigments in water with the addition of a dispersant and, if desired, an antifoam, for example using a dissolver; however, the thickener may also be added to the finished preparation, provided that the water balance of the finished construction protective material permits this to be done.

The synthetic resin copolymer dispersion used as binder according to the invention may already be present during the dispersion of the pigment and filler, but in most cases it is advantageously added to the filler/pigment paste which is still hot or also cooled, under rapid or also slower stirring. In order to maintain a pigment volume concentration of >60%, 4 to 35 parts by volume of synthetic resin dispersion copolymer are used per 65 to 95.9 parts by volume of filler+pigment.

The preparation of the .copolymer dispersions for the aqueous construction protective material preparations low in noxious substances emission according to the invention is carried out in known manner, preferably by emulsion polymerization in the presence of a radically initiated catalyst and at least one emulsifier at a pH of 2 to 6. The various known catalysts forming free radicals or also redox systems may be used as catalysts. The concentration range of the total amount of emulsifiers is preferably between 0.5 and 5% by weight, based on the total amount of monomer, where the emulsifiers may be anionic, non-ionic or, if appropriate, cationic emulsifiers. It is also possible to use latex stabilizers, such as, for example, water-soluble polymers selected from the group carboxymethylcellulose, hydroxyethylcellulose, polvinylpyrrolidone, poly-N- vinylacetamide, polyvinyl alcohol as well as combinations of emulsifiers and latex stabilizers, and also the known stabilizing comonomers based on monocarboxylic and dicarboxylic acids and the half-esters and amides thereof as well as vinylsulfonic acid and its salts.

Examples of monomers which are suitable for the preparation of the synthetic resin dispersion, are vinyl esters, in particular vinyl esters of aliphatic monocarboxylic acids of 1 to 12 carbon atoms, for example vinyl esters of lower ($C_1$–$C_6$)carboxylic acids such as vinyl acetate, vinyl propionate, vinyl butyrate, vinyl caproate, furthermore vinyl laurate, vinyl decanate and vinyl versatate, furthermore, for example, olefinically unsaturated compounds of the formula II.

(II)

in which $R^1$ denotes hydrogen, an alkyl radical of 1 to 4 carbon atoms, an alkoxy radical of 1 to 4 carbon atoms, a nitrile group, a halogen atom, preferably chlorine, or an alkoxycarbonyl radical of 2 to 12, preferably 2 to 9, carbon atoms, and $R^2$ represents hydrogen, a methyl or a vinyl group.

Examples of suitable monomers of the formula II are in particular olefins, for example ethylene and isobutylene, vinyl ethers, for example vinyl methyl ether, vinyl ethyl ether and vinyl n-butyl ether, furthermore acrylonitrile, methacrylonitrile, vinyl chloride, acrylic acid esters of monohydric alcohols, for example methyl acrylate, ethyl acrylate, butyl acrylate and 2-ethylhexyl acrylate, as well as methacrylic acid esters of monohydric alkanols, for example methyl methacrylate, ethyl methacrylate, butyl methacrylate and 2-ethylhexyl methacrylate. Equally suitable are maleic acid diesters, in particular of monohydric aliphatic alcohols of 2 to 10, preferably 3 to 8 carbon atoms, for example dibutyl maleate, dihexyl maleate and dioctyl maleate.

The monomers or monomer mixtures are chosen in such a manner that homopolymer-based, copolymer-based or ter-polymer-based synthetic resin dispersions having an MFT of <10° C. preferably <5° C. particularly <0° C., are produced. Any person skilled in the art knows on the basis of the Tg of the polymers and the polymerization parameters which monomers or mixtures of monomers must be employed for this purpose. Since the MFT below 0° C. can no longer be measured, the lower limit of the MFT can only be specified by the Tg. In this connection the Tg should not be below –20° C. preferably below –10° C. Suitable co-polymers are, for example, vinyl acetate/ethylene in the ratio 86/14 to 75/25, such as may be prepared at an ethylene pressure in the region from 25 to 60 bar. Other suitable copolymers are vinyl acetate/vinyl chloride/ethylene terpolymers in the ratio 58.8/25.2/16, prepared at an ethylene pressure of 40 bar and having an MFT of 10° C., or 60.8/15.2/24 and 45 6/30 4/24, such as may be obtained at an ethylene pressure of 50 bar and having an MFT of <0° C. and a Tg of –0.5 and +5.5° C. respectively. With vinyl acetate/butyl acrylate copolymer dispersions the suitable MFT range is obtained when the monomers are used in the ratio 80/20 to 50/50.

The main monomers are copolymerized with small amounts, particularly preferably with 0.05 to 0.3% by weight, based on the total amount of monomer, of olefinically unsaturated silicon compounds of the formula I containing hydrolyzable groups, the radical R in the formula I preferably denoting vinyl, allyl, γ-acryloxypropyl and γ-methacryloxypropyl, and $R^1$, $R^2$, $R^3$ preferably denoting alkoxy of 1 to 8 carbon atoms or alkoxyalkoxy of 2 to 10 carbon atoms, acetoxy or halogen, in particular chlorine.

Examples of particularly preferred compounds of the formula I are vinyltrimethoxysilane, vinyltriethoxysilane, vinyltrimethylglycolsilane, vinyltriacetoxysilane, γ-acryloxypropyltrimethoxysilane, γ-methacryloxypropyltrimethoxysilane, γ-methacryloxypropyltris-(2-methoxyethoxy)silane, vinyltrichlorosilane, vinylmethyldichlorosilane and allyltrimethoxysilane.

The silanes of the formula I may be added in the emulsion copolymerization either mixed with the main monomers or separately. They may be metered in uniformly with the other monomers or in the course of the polymerization or either in the first or the second half of the monomer amount. Only relatively small amounts of the above silanes are required to improve the properties of the synthetic resin dispersion according to the invention, preferably up to a maximum of 2% by weight, based on the total amount of monomers, preferably 0.1 to 0.4% by weight, particularly 0.05 to 0.2% by weight.

Removal of the unreacted monomers from the synthetic resin dispersion may be carried out chemically, i.e. for example by polymerization to completion. For this purpose catalysts forming free radicals are employed. Examples of such catalysts are peroxide and azo compounds, such as, for example, azobis(isobutyramidine hydrochloride). Equally particularly suitable are the combination types of catalysts in which both reducing agents and oxidation agents are used. When combination catalysts of this type are used, the reducing agent is generally termed activator and the oxidation agent initiator. Examples of suitable activators are bisulfites, sulfoxylates or compounds having reducing properties, such as, for example, ascorbic acid and ferrous salts. Examples of initiators are inter alia, hydrogen peroxide, persulfates such as sodium and potassium persulfate, perborates and also other pers compounds. Examples of special combination catalysts or redox systems which may be employed for the removal of the residual monomers by polymerization, are inter alia hydrogen peroxide and zinc formaldehyde sulfoxylate, hydrogen peroxide and sodium metabisulfite, sodium persulfate and sodium metabisulfite, hydrogen peroxide and sodium sulfite, hydrogen peroxide and rongalite, sodium or potassium persulfate and sodium sulfite, sodium or potassium persulfate and rongalite, hydrogen peroxide and ascorbic acid, tert-butylhydroperoxide and sodium sulfite, tert-butylhydroperoxide and rongalite, sodium persulfate and sodium thiosulfate. Metal salts, used in traces, such as, for example, 1 to 100 ppm per monomer equivalent of iron or copper salts, such as, for example, Mohr's salt, may further activate the redox system. Examples are tert-butylhydroperoxide/Mohr's salt/rongalite or sodium persulfate/sodium sullite/sodium thiosulfate/copper sulfate.

The redox catalyst is typically used in an amount between about 0.1 and about 2% by weight, preferably between about 0.25 and about 0.75% by weight, based on the amount of monomers. The activator is normally added in aqueous solution and the amount of activator generally is 0.25 to 1 times of the amount of initiator.

Physical methods, such as, for example, distillation, may also be used for the removal of residual monomers from the synthetic resin dispersion. Furthermore it is possible to combine chemical and physical methods. The removal of the residual monomers by distillation may take place under elevated, but preferably also under reduced pressure. In the removal of the residual monomers by distillation at 760 Torr or a lower pressure, the demonomerization may be speeded up by passing steam or a carrier gas, such as, for example, air, nitrogen or carbon dioxide, across the surface of the synthetic resin dispersion. However, the carrier gas is preferably passed in the demonomerization apparatus from the bottom through the synthetic resin dispersion. The residual monomers removed by physical methods from the synthetic resin dispersion are recovered by being condensed in a condenser. If a carrier gas is used in the demonomerization, coolants having a lower temperature than water from 0° to 30° C. for example cooling brine or acetone/dry ice, are employed if appropriate in the condenser. Furthermore, the residual monomers may be removed in vacuo and recovered from the synthetic resin dispersion by the use of pumps with rotary slide valves. The content of residual monomers and other volatile organic substances possibly originating from the starting materials or of volatile organic constituents formed in the polymerization, and of the alcohol which is formed in the hydrolysis of the copolymerized silicon compound of the formula I in the synthetic resin copolymer dispersion to be used according to the invention is less than 0.1% by weight, preferably 0.05 to 0.001% by weight, based on the dispersion copolymer.

Surprisingly in the case of binders having a low MFT, the copolymerization with tracers of copolymerizable silanes of the formula I gives rise to dispersion copolymers of a pigment binding power as great as that normally only achievable with dispersion (co)polymers having a high MFT, such as, for example, styrene/acrylate, when large amounts of solvent are added to the synthetic resin dispersion or to a dispersion paint prepared from it.

Synthetic resin copolymer dispersions based on vinyl acetate/ethylene and vinyl acetate/vinyl chloride/ethylene are preferably used for the odourless aqueous preparations, low in noxious substances emission, of construction protective materials, in addition to water, filler, pigment, dispersant, thickener, antifoam and preservative. To attain a low MFT, the ethylene pressure chosen must be higher in the case of vinyl acetate/vinyl chloride/ethylene than in the case of vinyl acetate/ethylene because of the higher freezing temperature of polyvinyl chloride. The resultant dispersion copolymers or the aqueous dispersions thereof have the advantage that copolymer dispersions may be made available which possess the low MFT required according to the invention.

Furthermore, because of the low boiling points of the monomers used, the synthetic resin dispersions prepared in this manner possess great advantages over styrene/acrylate and styrene/butadiene copolymers with their unpleasant by-products which may form, for example, by a Diels-Alder reaction.

The vinyl acetate/ethylene dispersion copolymers and the corresponding terpolymers with vinyl chloride may be advantageously prepared by copolymerization in water with the aid of anionic, non-ionic or cationic emulsifiers in the form of aqueous dispersions. Water-soluble, stabilizing polymers such as carboxymethylcellulose, hydroxyethylcellulose, polyvinylpyrrolidone, poly-N-vinylmethylacetamide and polyvinyl alcohol can be used for this purpose, as well as the known stabilizing comonomers based on monocarboxylic and dicarboxylic acids and their half-esters and amides. Furthermore, known initiator systems such as, for example persulfates, sodium persulfate/sulfite and tert-butylhydroperoxide/$Fe^{2+}$/rongalite may be advantageously used for the polymerization.

If the appropriate autoclaves are not available, such as are normally required for the copolymerization with ethylene and/or vinyl chloride, it is also possible to obtain dispersion copolymers according to the invention having the required MFT by copolymerization of customary monomers with those monomers that can strongly lower the MFT, such as, for example, 2-ethylhexyl acrylate, dioctyl maleate, vinyl versatate or butadiene. However, the copolymers and terpolymers based on vinyl acetate/ethylene and vinyl acetate/vinyl chloride/ethylene possess the quite considerable advantage that because of their low boiling points their starting monomers are readily freed from the residual monomer part which has not reacted in the polymerization.

By choosing appropriate technical measures, it is furthermore possible to use the recovered residual monomers for further polymerizations.

The above dispersion copolymers based on vinyl acetate/ethylene and vinyl acetate/vinyl chloride/ethylene with comonomers of the formula I are particularly preferred according to the invention.

By the combination of redox and strip processes or by the strip process alone for removing the residual monomers, the proposition is made here for the first time in connection with the preparation of low-emission construction protective materials according to the invention and the use of hydrolyzable and copolymerizable silanes of the formula I for the removal of mostly readily volatile alcohols formed in the hydrolysis of silanes. A special and preferred embodiment of the invention of unexpectedly great technical advance is based on the following mode of operation. Synthetic resin copolymer dispersions are prepared which contain, for example hydroxyethylcellulose or poly-N-vinylmethylacetamide as protective colloids and which contain in addition to these protective colloids preferably non-ionic emulsifiers and in addition to non-ionic emulsifiers only small amounts of ionic such as anionic or cationic emulsifiers. It is advantageous in this connection for further stabilization of the co-polymer dispersion to use at the same time unsaturated hydrophilic comonomers capable of copolymerization, such as, for example, unsaturated monocarboxylic and dicarboxylic acids and their half-esters and amides as well as sodium methacrylamido-2-methyl-2-propanesulfonate or sodium vinylsulfonate. Synthetic resin copolymer dispersions are thus obtained with not very small particle sizes, such as, for example, $\leq 0.1$ μm, but with mean particle sizes of at least 0.1 μm, preferably $\geq 0.15$ μm, particularly $\geq 0.2$ μm. They are distinguished by outstanding application properties, such as, for example, in that the synthetic resin dispersions are readily miscible with dry fillers and pigments and the construction protective materials prepared therefrom are highly resistant over the usual extended storage period.

For many years vain attempts were made by experts to prepare these dispersions, as advantageous on account of their application properties as those based on vinyl acetate/ethylene and vinyl acetate/vinyl chloride/ethylene and also possessing very high pigment binding power. This object has now been achieved in an unexpectedly advantageous manner by the present invention by the use of dispersion copolymers which contain comonomeric units derived from silicon compounds of the formula I, which units carry small amounts of hydrolyzable silicon-containing radicals or which form $Si(OH)_x$ groups (x=1 to 3), and whose aqueous dispersions have an MFT of <10° C. When these dispersion copolymers are used as binders in the aqueous preparations of construction protective materials under discussion, the so-called crazing of the dried coating and of the dried coating even after only a brief drying period of the preparation, as assessed by the resistance to washing and shearing of coatings according to DIN 53,778, surprisingly does not occur, despite the absence of solvents and film-consolidating auxiliaries, i.e the coating does not possess inadequate mechanical strength after a brief drying period, as can be frequently observed with paints derived from polymer dispersions.

Those aqueous preparations of construction protective materials according to the invention are particularly suitable and preferred which contain solvent-free synthetic resin copolymer dispersions having a low MFT as binders and whose copolymers contain in toto only small amounts of monomeric units derived from silicon compounds of the formula I, which units are capable of copolymerization and carry hydrolyzable silicon-containing radicals or form $Si(OH)_x$ groups (x=1 to 3), viz. preferably 0.05 to 2% by weight, particularly 0.1 to 0.4, particularly preferably 0.05 to 0.2% by weight, based on the copolymer, and the copolymers were prepared by emulsion copolymerization from combinations of comonomers which result in the required low MFT values, in the presence of hydroxyethylcellulose, a non-ionic emulsifier, small amounts of monomeric vinyl sulfonate, with the addition in toto of only small amounts of comonomers of the formula I.

In order to tint dispersion paints and dispersion plasters, commercially available pigment pastes are frequently used. These pigment pastes generally contain solvents for reasons of stability or their preparability. A novel path has also been taken according to the invention for overcoming the resultant difficulties. Because of the high stability of the synthetic resin copolymer dispersion used according to the invention and its comparability with dry pigments, the preparation and use of pigment pastes containing solvents is unnecessary, since the pigment may be admixed with the synthetic resin dispersion or the white dispersion paint or the dispersion plaster in the dry state, if desired.

The advance in properties achievable in dispersion copolymers having MFT values of their aqueous dispersions of <10° C. in the case of the aqueous preparations of construction protective materials according to the invention prepared therefrom by the presence of small amounts of monomeric units derived from silicon compounds of the formula I was very surprising for the person skilled in the art, since this advance made possible the utilization of a number of other advantages in combined form, viz. a trouble-free dispersion preparation, the great stability of the synthetic resin copolymer dispersions to be used according to the invention and their unexpectedly high pigment binding power. Only the combination of these unexpectedly advantageous properties has made the preparability of the dispersion paints, coating materials and synthetic resin dispersion plasters according to the invention free from solvents, film-consolidating auxiliaries and plasticizers at all possible. To this can be added that in the preparation of the synthetic resin copolymer dispersion the use of ammonium salts and amine salts such as, for example, $(NH_4)_2S_2O_8$, may be generally dispensed with and the alkali metal salts such as, for example sodium persulfate, used in their place, in order that no unpleasant ammonia and/or amine odor may be produced in the alkaline coating materials and construction protective materials for the user and the environment. Likewise amines such as, for example, diethylamine and triethylamine as well as diethanolamine and triethanolamine, as constituents of the aqueous preparations of construction protective materials are avoided. For the same reason particularly the sodium salts of anionic dispersants are used as pigment dispersants. The same holds for the emulsifiers in the polymerization. The sodium salts of, for example, sulfated oxethylated alcohols and alkylphenols are used and not the ammonium and/or alkylammonium salts.

In the production of the synthetic resin copolymer dispersions and particularly in their demonomerization as well as in the production of coating materials and plasters, foam formation may be very annoying. This may be prevented by the use of small amounts, preferably 0.001–0.5% by weight, based on the dispersion, of antifoams based on natural fats and oils, such as, for example, sperm oil and train oils, paraffin oil, long-chain alcohols such as cetyl alcohol, high-polymeric glycols and mixtures of these alcohols with fats as well as fatty acid polyglycol esters, sorbitol monolaurate and silicones.

It is true that the use of dispersion paints and plasters is at its most advantageous when employed immediately after being prepared. It is known from experience, however, that the finished containers are often stored for more or less prolonged periods at the manufacturer, at the dealer and/or at the user before being actually put into use. In order to avoid impairment of quality, the construction protective materials are in most cases treated by preservatives by the manufacturer. To protect the products against subsequent attack by fungi or bacteria, no or only very small amounts of biocidal additives are employed if possible. Alternatively, preservation can be achieved by heating the finished product for 15 to 120 minutes at temperatures from 60° to 120° C., for example by pasteurization or tyndallization (also called fractional sterilization), also by cooling as well as by excluding air during storage in gas-tight containers under inert gas. Ultrasound, UV irradition and high-frequency fields may also be used for preservation. Furthermore, additions of minimal amounts of antibiotics, such as, for example terramycin, streptomycin and subtilin are suitable, likewise quinosol (equimolar compound of o-oxyquinoline sulfate and potassium sulfate).

Furthermore, the following, used in minimal amounts, can be inter alia effective preservatives: chloroacetamide, sodium benzoate, methyl, ethyl and propyl p-hydroxybenzoates and sodium compounds thereof, sodium sorbate, sodium formate, sodium borate as well as borax, hydrogen peroxide, lactic acid, formic acid, propionic acid, nitrites and nitrates, salicylic acid, dehydracetic acid, thymol (methylisopropylphenol), barium metaborate, dithiocarbamates, chloromethylisothiazolinone and benzisothiazolinone.

The invention is elucidated in greater detail by the examples below.

COMPARISON EXAMPLE 1

Preparation of a vinyl acetate/ethylene copolymer dispersion not useable according to the invention with subsequent residual monomer elimination.

An aqueous solution, consisting of the following constituents, is placed in a pressure apparatus provided with a stirrer, Jacketed heating and metering pumps: 10,700 g of water, 142 g of sodium acetate trihydrate, 1760 g of a 20% by weight aqueous solution of nonylphenol oxethylated with 30 mol of ethylene oxide, 13,700 g of a 5% by weight aqueous solution of hydroxyethylcellulose (HEC solution) (viscosity of the 2% by weight aqueous solution being 300 mPa.s), 572 g of a 30% by weight aqueous solution of sodium vinylsulfonate and 34.3 g of a 1% by weight aqueous solution of ferrous sulfate heptahydrate. The pH of the solution is 11.2. The apparatus is freed from atmospheric oxygen and ethylene is introduced in the apparatus under pressure. At an ethylene pressure of 20 bar 5900 g of vinyl acetate and 10% of a solution of a reducing agent consisting of 27.1 g of rongalite in 2 liters of water are metered in. The internal temperature is brought to 60° C. and the ethylene pressure has increased to 40 bar. 10% of an initiator solution consisting of 27.1 g of tert-butylhydroperoxide in 2000 g of water are then metered in at an internal temperature of 60° C. and the apparatus is cooled to conduct away the heat of reaction. 24,600 g of vinyl acetate, the remaining 90% of the solution of reducing agent and the remaining 90% of the initiator solution are subsequently metered in, the ethylene pressure being maintained at 40 bar. A solution consisting of 34.32 g of sodium persulfate in 800 g of water is then metered in and the internal temperature is increased to 80° C. and maintained at this temperature for 1 hour. The greater part of the unreacted ethylene is subsequently removed by gas with stirring and collected in a gasometer, and 2 liters of water are added. Vacuum is then applied and 2.6 liters of water are then distilled off in the course of 2 hours, the residual content of vinyl acetate of the dispersion being thus reduced to 0.05% by weight based on the dispersion. By repeating the separation procedure a residual content of vinyl acetate of 0.012% by weight is achieved.

Characterization of the resultant copolymer dispersion

| Solids content (% by weight): | 55 |
| --- | --- |
| pH (electrode measurement): | 4.8 |
| Viscosity (Pa · s): | 0.5 |
| Minimum film-forming temperature (MFT), °C.: | <0 |
| Freezing temperature of the polymer (Tg), °C.: | 2 |

EXAMPLES 1 TO 4

Preparation of vinyl acetate/ethylene/vinyltrimethoxysilane copolymer dispersions useable according to the invention with subsequent elimination of the residual monomers and other readily volatile constituents.

Polymerization is carried out in the apparatus and by the method of Comparison example 1 except that increasing amounts of vinyltrimethoxysilane are dissolved in the total amount of 30,500 g of vinyl acetate and the homogeneous vinyl acetate solutions resulting in each case are used in the polymerization of the Examples 1 to 4. The following individual amounts of vinyltrimethoxysilane are added to the vinyl acetate:

| In Comparison example 1: | 0 g = 0% | by weight, based on the copolymer |
| --- | --- | --- |
| In Example 1: | 34.32 g = 0.1% | by weight, based on the copolymer |
| In Example 2: | 68.64 g = 0.2% | by weight, based on the copolymer |
| In Example 3: | 171.6 g = 0.5% | by weight, based on the copolymer |
| In Example 4: | 343.2 g = 1.0% | by weight, based on the copolymer |

The parameters of the resultant copolymer dispersions as well as the solids content, the pH and the viscosity of the dispersions show practically no change in Examples 1 to 4 from those in Comparison example 1. Only in Example 4 does the solids content of the resultant dispersion drop to 52.7% by weight and the mean particle diameter increases to 0.9 µm. The essential characteristics of the resultant dispersion copolymers with increasing amount of the silane used are the decreasing melt index, the reduction or absence of the so-called crazing of the coating and the improvement of the wet abrasion resistance of the coating based on a high-fill indoor paint. The result of the comparison tests performed in order to obtain the characteristic parameters is given in a summary form in Table 1.

General formulation for high-fill dispersion indoor paints produced for comparison tests

|  | Parts by weight |
| --- | --- |
| Water: | 3110 |
| Methylhydroxyethylcellulose: (2% aqueous solution, visc. 3000 mPa · s): | 60 |
| Na salt of a polyacrylic acid of a MW 2000 (30% by weight aqueous solution): | 35 |
| Sodium polyphosphate (10% by weight aqueous solution): | 150 |
| Sodium hydroxide (10% by weight solution): | 20 |
| Preservative: | 15 |
| Antifoam: | 20 |
| Talc: | 600 |
| Kaolin: | 400 |
| Titanium dioxide: | 700 |
| Calcium carbonate (particle size: 90% by weight < 2 µm): | 2300 |
| Calcium carbonate (particle size: 50% by weight < 2 µm): | 1500 |
| Synthetic resin dispersion (55% by weight): | 1090 |
| Total amount of dispersion paint | 10,000 |

Preparation of dispersion indoor paints according to the preceding general formulation.

The methylhydroxyethylcellulose in powder form is sprinkled in the water and dissolved with stirring; the solutions of the sodium polyacrylate and sodium polyphosphate and the 10% by weight solution of sodium hydroxide are then added with stirring. The resultant viscous solution is then treated with the preservative and the antifoam. Talc and kaolin are first dispersed in the mixture by stirring using a dissolver at a stirring rate of 2000 rpm, the rate of stirring is then increased to 5000 rpm and titanium dioxide and the varieties of calcium carbonate are added. Dispersion is continued for a further 20 minutes at 5000 rpm, the temperature of the pigment/filler paste increasing to 60° C. The mixture is allowed to cool to 30° C., the pH being 9.3.

In order to examine the parameters of the synthetic resin copolymer dispersions described, in each case 891 g of the pigment/filler paste are added with stirring to 109 g of the 55% by weight synthetic resin copolymer dispersion to be tested in each case. (3 minutes using a Lenard stirrer at 1500 rpm). After one day the dispersion paints prepared in this manner are spread onto a Leneta film using a 300 µm doctor blade and after being dried for 5 days at 23° C. and 50% relative humidity, the coatings are placed in a Gardner apparatus and the number of double rubbings (DR) according to Gardner, withstood by the coating, are determined. In this context increasing DR numbers denote increasing quality of the coating. The results may be found in Table 1.

| Copolymer dispersion*) from example No. | Content of vinyltrimethoxy-silane in the copolymer % by wt. | Melt index of the copolymer ($i_{21.6/120°C}$) | Number of double rubbings (DR) according to Gardner withstood by the coating | Crazing of the coating | Repeat of the measurements after heat treatment of the coating (4 hrs at 60° C.) DR acc. to Gardner | Crazing of the coating |
| --- | --- | --- | --- | --- | --- | --- |
| 1 | 0.1 | 11.1 | 348 | medium | 275 | slight |
| 2 | 0.2 | 4.8 | 658 | none | 591 | none |
| 3 | 0.5 | 2.1 | 659 | none | 607 | none |
| 4 | 1 | 0.3 | 449 | none | 296 | none |
| Comparison Example 1 | 0 | 18.4 | 217 | extensive | 145 | extensive |

*)Copolymer dispersions demonomerized according to the invention having a residual vinyl acetate content of 0.05% by weight based on the copolymer, are used with the synthetic resin copolymer dispersions of Examples 1 to 4. The solids content of the dispersion paints is determined according to DIN 53189 and is 62.75% by weight in each case. The volatile constituents of the dispersion paints, consisting almost exclusively of water, correspondingly amount to 37.25% by weight: After a determination by gas chromatography at a transition temperature of up to 250° C., the volatile constituents of the dispersion paints according to the invention contain besides water only 0.0017% by weight of volatile non-aqueous substances.

As the results in Table 1 indicate, the pigment binding power of the low-emission indoor paints increases with increasing amount of vinyltrimethoxysilane, when the molecular weight of the copolymer increases (decreasing melt index $i_{21.6}$ at 120° C. corresponds to an increasing melt viscosity of the copolymer, 21.6 being the weight of the die in kg), while the so-called crazing diminishes.

EXAMPLES 5 TO 8

Example 2 is repeated in the Examples 5 to 8 with the proviso that in the preparation of the copolymer dispersion according to Example 2 the mean particle size of the dispersion copolymer obtained from vinyl acetate and ethylene while retaining a vinyltrimethoxysilane content of 2% by weight, is varied by a modification of the emulsifier/protective colloid system known to the person skilled in the art. It can be seen from this that the pigment binding power of the dispersion increases with decreasing particle size. The MFT of the dispersions is in the neighborhood of <0° C. Comparison dispersion indoor paints are prepared according to the general formulation given in Examples 1 to 4 for the preparation of high-fill dispersion indoor paints, using the dispersions of Examples 5 to 8, and the double rubbing tests according to Gardner are carried out on the coatings prepared therefrom. The result of these tests as well as individual details of the compositions and properties of the copolymer dispersions of Examples 5 to 8 are given in Table 2.

COMPARISON EXAMPLE 2

A commercially available vinyl acetate/vinyl chloride/ethylene terpolymer dispersion having an MFT of 12° C. is used as comparison for the copolymer dispersions of Examples 5 to 8. In the same manner as in the Examples according to the invention, the addition of solvents to the synthetic resin dispersion or to the dispersion paint is dispensed with. When this commercially available dispersion is used in a comparison series of experiments in a comparative manner with dispersions of the Examples 5 to 8, worse results are obtained than those with the copolymer dispersions according to the invention having low MFTs and low contents of silane comonomer units. The results are given in Table 2.

TABLE 2

| Example No. | Variation of the mean particle diameter of the copolymer according to Example 2 µm | Test of the coating Number of double rubbings (DR) according to Gardner withstood by the coating | Crazing of the coating | Repeat of the measurement after heat treatment of the coating (4 hrs at 60° C.) DR acc. to Gardner | Crazing of the coating |
| --- | --- | --- | --- | --- | --- |
| 5 | 0.359 | 570 | none | 531 | none |
| 6 | 0.264 | 1373 | none | 904 | none |
| 7 | 0.218 | 1266 | none | 946 | none |
| 8 | 0.176 | 1034 | none | 1210 | none |
| Comparison Example 2 | 0.161 | 593 | medium | 573 | medium |

EXAMPLE 9

556.7 g of electrolyte-free water (D-water), 40 g of a 20% by weight aqueous solution of oxethylated nonylphenol (oxethylation degree 30), 8 g of sodium lauryl sulfate, 13.3 g of a 30% by weight sodium vinylsulfonate and 3.3 g of crystallized sodium acetate are initially introduced into a 2 liter flask provided with a stirrer, internal thermometer and nitrogen inlet, and mixed with stirring. 10% of a monomer mixture consisting of 558.9 g of vinyl. acetate, 239.5 g of butylacrylate and 1.6 g of vinyltrimethoxysilane are added at room temperature and the mixture is heated. 1.6 g of sodium persulfate, dissolved in 19.2 g of water, are added at 35° to 45° C. and the mixture is further heated at an internal temperature of 70° C. The remaining 90% of the monomer mixture is metered in in the course of 2.5 hours. 10 minutes after the end of the monomer addition 0.8 g of sodium persulfate in 19.2 g of water are added and the dispersion is further heated for 2 hours at 85° C. During this time the residual unreacted monomer is distilled off using a distillation bridge, while a slow nitrogen stream is passed in, after which the content of residual monomers is 0.05% by weight, based on the dispersion copolymer. The dispersion is cooled and filtered through a 160 μm sieve, 0.28 g of moist coagulate accruing as residue. The dispersion has a solids content of copolymer of 55.1% by weight, a mean particle diameter of 137 nm and a film-forming temperature (white spot/film tear) of <0/2° C.

A dispersion paint is prepared from 891 g of pigment/filler paste and 109 g of 55.1% by weight of the synthetic resin copolymer dispersion from Example 9, using the general formulation given in Examples 1 to 4 for the preparation of high-fill dispersion indoor paints. A coating prepared from this paint, dried for 5 days at 23° C., has a value of 500 DR in the Gardner abrasion resistance test without crazing.

COMPARISON EXAMPLE 3

The procedure of Example 9 is followed, except that a mixture of 560 g of vinyl acetate and 240 g of butylacrylate are used as the mixture of monomers. The resultant synthetic resin copolymer dispersion has virtually the same MFT as the copolymer dispersion prepared according to Example 9. Compared with the high-fill dispersion indoor paint prepared in Example 9, the synthetic copolymer dispersion not according to the invention, obtained in the present case, yields a coating which, when dried for 5 days at 23° C. has a value of only 300 DR in the Gardner abrasion resistance test with a medium to strong crazing. This result is distinctly worse than the result obtained in a comparative manner in Example 9 using the copolymer dispersion containing silanol units according to the invention.

We claim:

1. A process of preparing an aqueous preparation comprising an aqueous synthetic resin dispersion possessing a minimum film-forming temperature (MFT) of below 10° C. by a) free radical emulsion polymerization of olefinically unsaturated monomers in the presence of 0.05 to 0.4% by weight, based on the total amount of monomers, of an unsaturated hydrolyzable organic silicon compound of the formula I,

in which R denotes an organic radical olefinically unsaturated in the ω-position and $R^1$, $R^2$ and $R^3$ which may be identical or different, denote halogen or the group —OZ, Z denoting primary or secondary alkyl radicals or acyl radicals optionally substituted by alkoxy groups, or hydrogen, b) adjusting the pH of the aqueous dispersion in the range of 5.5 to 10 and subsequently c) removing volatile alcoholic components formed by hydrolysis of compounds of formula I and volatile amounts of residual monomers by distillation to a content of volatile non-aqueous constituents in the aqueous preparation to below 0.1% by weight, based on the total non-volatile part, and d) adding fillers, pigments and auxiliaries selected from the group consisting of wetting agents, dispersants, emulsifiers, protective colloids, thickeners, antifoams, dyes and preservatives.

* * * * *